Jan. 20, 1959          S. E. ROSE          2,869,651

MOUNTING ARRANGEMENT FOR PROPELLER TYPE FAN

Filed June 25, 1957

INVENTOR.
STANLEY E. ROSE
BY
HIS ATTORNEY

United States Patent Office 2,869,651
Patented Jan. 20, 1959

2,869,651

MOUNTING ARRANGEMENT FOR PROPELLER TYPE FAN

Stanley E. Rose, Lyndon, Ky., assignor to General Electric Company, a corporation of New York Application June 25, 1957, Serial No. 667,940

1 Claim. (Cl. 170—173)

The present invention relates to an improved mounting arrangement for attaching a propeller type fan to a drive shaft, and more particularly to such an arrangement which permits easy removal of the fan from the shaft.

It is a primary object of the present invention to provide a fan having a new and improved hub for removably mounting a fan onto a rotary drive shaft.

More specifically, it is an object of the present invention to provide a fan hub provided with a large enough clearance to permit ease in sliding it over the shaft and having a pressure actuated securing means integral therewith which clasps the hub onto the shaft and prevents axial movement of the hub and fan along the shaft.

Further objects and advantages of the present invention will become apparent as the following description proceeds and the features of novelty which characterize the invention will be pointed out with particularity in the claims annexed to and forming a part of this specification.

In carrying out the objects of the present invention, a fan is provided having a hub with a flat therein which mates with a corresponding flat on a rotary drive shaft. The hub is arranged to slide axially onto the shaft and fit loosely thereon. As an integral part of the hub, a cylindrical extension is provided which protrudes axially from the hub. The extension also fits loosely on the shaft when the fan is placed onto the shaft. The cylindrical extension is divided into a plurality of sections by slots extending longitudinally from the end of the extension toward the hub, the sections being resiliently movable in the direction normal to the axis of the hub to reduce the inner diameter of the hole within the cylindrical extension portion of the hub. Means are provided around the outer periphery of the cylindrical extension to compress the sections of the cylindrical extension into intimate engagement with the shaft thereby preventing axial movement of the fan along the shaft.

For a better understanding of the invention, reference may be had to the accompanying drawing in which.

Figure 1:
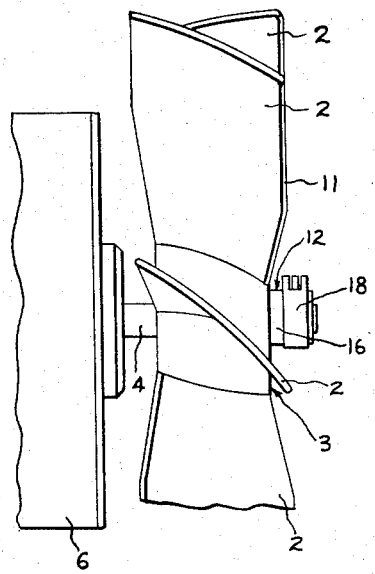
Fig. 1 is a side elevation view showing the fan mounted on a shaft.
Figure 2:
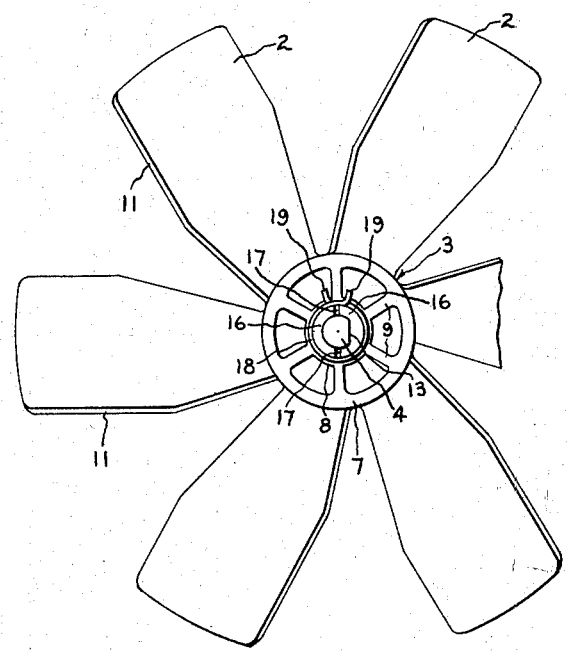
Fig. 2 is a front elevation view of the fan and shaft mounting arrangement of Fig. 1.

Referring now to Figs. 1 and 2 of the drawing, there is shown a plastic fan incorporating the mounting means of the present invention. The fan contains a plurality of blades 2 extending radially from a hub, generally designated 3. The fan is rotatably mounted on the shaft 4 driven by the motor 6. As may be seen in Fig. 2, the hub 3 comprises an outer cylindrical portion 7 and the inner cylindrical portion 8 (shown more clearly in Fig. 2) connected by a plurality of ribs 9. The fan blades 2 extend radially outwardly from the outer cylindrical portion 7 and are connected to the hub at their base portion with the leading edge 11 of the blades connected to the outer cylindrical portion 7 in the region opposite the ribs 9. By connecting the leading edge at the point opposite the ribs greater load carrying strength is provided in the fan structure. As is very evident from the design of the fan, it lends itself to one piece molding techniques whereby the fan may be manufactured from any suitable plastic material such as polystyrene, phenolic or nylon. Thus, with the fan being entirely formed out of a plastic material there is no galvanic corrosive action between the fan and the shaft and this, in itself, makes the subsequent removal of the fan an easily accomplished objective.

Figure 3:
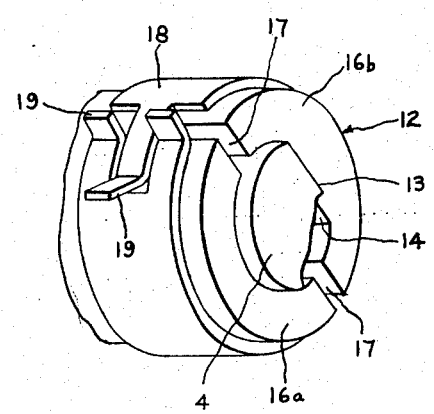
Fig. 3 is a perspective view with a portion of the shaft broken away to show in greater detail the mounting arrangement in relation to the shaft.

In order to mount the fan on the shaft 4, the inner cylindrical portion 8 is provided with a cylindrical extension 12 as may be more clearly seen in Fig. 3. To prevent rotation of the fan with respect to the shaft 4 the shaft is provided with a flat 13 which extends from the end of the shaft a distance along the shaft toward the motor 6. This flat 13 mates with a corresponding flat portion 14 in the inner cylindrical portion 8 which extends the entire length of the hole through the cylindrical extension 12 and the inner hub 8. The hole within the inner cylindrical portion 8 is made sufficiently large to permit the fan to be easily placed onto the shaft 4 and to be slid axially onto the shaft even though the shaft may be heavily corroded. It was found that a hole having an inner diameter of .005 greater than the outer diameter of the shaft was sufficient to provide this loose fit between the hub and the shaft and permit the fan to slide along the shaft with very little binding.

In order to clamp the fan into place on the shaft 4 after assembly thereto and to prevent the fan from moving axially on the shaft, the cylindrical extension 12 is divided into a plurality of sections 16 by slots 17 extending longitudinally from the end of the cylindrical extension 12 toward the hub. As may be seen in Fig. 3, the slots 17 divide the cylindrical extension 12 into a pair of sections 16a and 16b. Obviously, more slots could be provided and the cylindrical extension could be broken up into more than two sections. The slots 17 separate the sections 16 by a small distance thereby permitting the sections to yield and permit them to be squeezed together in a direction normal to the axis of the hub to reduce the inner diameter of the hole within the hub. The dimensions of the cylindrical extension must be such that when the extension is divided into a plurality of sections the walls permit the sections to give or displace sufficiently to clamp onto the shaft 4. As can be seen in Fig. 2, the cylindrical extension 12 has an outer diameter slightly less than the outer diameter of the inner cylindrical portion 8 in order to reduce the over-all thickness of the sections and thereby permit the sections to be displaced resiliently or moved inwardly normal to the axis of the hub. It was found, in a fan made from Bakelite—BMC11 or Bakelite—RMD4511 having two sections similar to those illustrated by the fan in the drawing, that if the sections had a wall thickness of approximately ⅛ of an inch and were at least ⅝ of an inch long the sections would "give" several hundredths of an inch without taking on a permanent set or without breaking.

A spring clip or other compression means 18 is employed around the outer perimeter of the cylindrical extension 12 to exert a pressure on the cylindrical extension thereby providing low stress clamping of the extension and the hub onto the motor shaft. The spring clip 18 is provided with tabs 19 which may be pressed together to enlarge the inner diameter of the spring clip for easily placing the clip over the outer perimeter of the cylindrical extension. Upon release of the tabs 19, the spring clip 18 exerts a pressure on the outer periphery of the cylindrical extension 12 thereby compressing the sections 16 onto the shaft to hold the fan in place, and thereby preventing axial movement of the fan on the shaft. It has been noted that greater compressive force may be exerted by the spring clip if the clip is arranged around the cylindrical extension with the tabs 19 closely adjacent one of the slots 17. By merely pressing the tabs 19 together to permit the sections 16 to regain their normal position, the fan may be slid axially along the shaft and be easily removed.

By the present invention there is provided a one piece plastic fan having a new and improved mounting arrangement which permits easy removal and assembly of the fan onto the shaft even when the shaft is heavily corroded and which employs a pressure actuated securing means, integral with the hub, for maintaining the fan in position on the shaft.

While in accordance with the patent statutes there has been described what at present is considered to be the preferred embodiment of the invention, it will be understood by those skilled in the art that various changes and modifications may be made therein without departing from the invention and it is, therefore, the aim of the appended claims to cover all such changes and modifications as fall within the true spirit and scope of the invention.

What I claim as new and desire to secure by Letters Patent of the United States is:

A fan comprising a hub having inner and outer cylindrical portions connected by a plurality of supporting ribs, a plurality of fan blades extending radially outward from said outer cylindrical portion and connected to said outer cylindrical portion with the leading edge of each blade opposite a supporting rib, a rotary drive shaft having a flat extending from the end thereof a distance along said shaft, said inner cylindrical portion arranged to fit loosely on said shaft and having a mating flat portion therein, a single cylindrical extension integral with and protruding axially from said inner cylindrical portion and also containing said mating flat portion therein, said cylindrical extension being divided into a plurality of sections by slots extending longitudinally from the end of said cylindrical extension toward said inner cylindrical portion so that each of said sections is integrally connected at one end with said inner cylindrical portion, said sections being resiliently movable in a direction normal to the axis of said hub to reduce the inner diameter of said cylindrical extension, and spring clip means for applying a pressure to the outer periphery of said cylindrical extension whereby said sections are moved into engagement with said shaft to prevent axial movement of said fan thereon.

References Cited in the file of this patent

UNITED STATES PATENTS

| | | |
|---|---|---|
| Re. 4,288 | Buckman | Mar. 7, 1871 |
| 513,359 | Bache | Jan. 23, 1894 |
| 688,860 | Kay et al. | Dec. 17, 1901 |
| 1,717,663 | Checkley | June 18, 1929 |
| 2,212,072 | Newnham | Aug. 20, 1940 |